United States Patent [19]

Zdunek et al.

[11] Patent Number: 4,612,415
[45] Date of Patent: Sep. 16, 1986

[54] DYNAMIC CONTROL OF TELEPHONE TRAFFIC IN A TRUNKED RADIO SYSTEM

[75] Inventors: Kenneth J. Zdunek, Schaumburg; Garry C. Hess, Hanover Park, both of Ill.

[73] Assignee: Motorola, Inc., Schaumburg, Ill.

[21] Appl. No.: 637,515

[22] Filed: Aug. 3, 1984

[51] Int. Cl.⁴ .............................................. H04B 1/00
[52] U.S. Cl. .................... 179/2 EB; 455/56; 455/33
[58] Field of Search ............... 179/2 E, 2 EB; 455/33, 455/56, 53, 54

[56] References Cited

U.S. PATENT DOCUMENTS

| | | | |
|---|---|---|---|
| 3,764,915 | 10/1973 | Cox et al. | 325/53 |
| 3,786,199 | 1/1974 | Rimbach, Jr. | 179/41 |
| 4,414,661 | 11/1983 | Karlstrom | 370/95 |
| 4,435,840 | 3/1984 | Kojima et al. | 455/33 |

Primary Examiner—Robert G. Lev
Attorney, Agent, or Firm—James E. Jacobson, Jr.; Edward M. Roney; Donald B. Southard

[57] ABSTRACT

A method and means for controlling telephone interconnect traffic on a trunked radio system is described. The present invention continuously monitors all types of communication traffic on the system and in response to an increasing dispatch access delay, reserves certain repeaters for dispatch use only during a predetermined period. The present invention also contemplates a system in which the number of simultaneous telephone interconnect calls permitted on the system during a predetermined period is dynamically altered in response to system loading. In addition, the present invention establishes a variable, periodically updated, maximum interconnect call length based on the current system dispatch access delay.

21 Claims, 13 Drawing Figures

DYNAMIC CONTROL OF TELEPHONE TRAFFIC IN A TRUNKED RADIO SYSTEM

BACKGROUND OF THE INVENTION

1. Field of the Invention

This invention relates generally to the field of trunked radio systems and specifically to a method and means for automatically maintaining critical system parameters in a trunked radio system which provides for automatic interconnect to a conventional public switched telephone system.

2. Description of Prior Art

Trunked radio systems have developed as a means of providing increased user mobile unit capacity in systems which operate in a fixed geographic area. In the past a typical radio system was comprised of a base station transmitting and receiving on a single frequency and a fleet of mobile units operating on that same frequency. The capacity of this type of radio system is severely limited by the number of users and the average length of calls on those frequencies. Trunked systems alleviate the constraints of the single frequency systems by operating on several alternative frequencies, and communication between a base unit and mobile is done on channels which are dynamically assigned by a control unit on a separate control channel. In effect, trunking systems provide for automatic channel assignment in a land mobile radio. Trunked ratio systems improve both spectral efficiency and operating characteristics of land mobile radio systems.

Trunked radio systems are operated with stringent system constraints. The most important of these constraints is the amount of time in which a dispatch call request must wait to be assigned to an operative radio frequency. The dispatch access time period is affected by the number and duration of all types of calls which are operative on the system at any particular time. The dispatch access time parameter is especially critical in light of recent developments toward interconnecting conventional telephone systems to trunked radio systems (FCC docket 20846). The characteristics of telephone interconnect traffic are very different from those of trunked radio dispatch traffic. Research done by the Federal Communications Commission has shown that the average message length for interconnect calls is approximately 119 seconds and our research has shown that the average message length for dispatch telephone calls is approximately 21.9 seconds. The effects of long message lengths for telephone traffic are manifested in the "system access delay" that a user experiences when placing a call on a busy system. System access delay may be thought of as the time that a user waits for a free channel, as a function of system loading.

A pure dispatch trunked system can accommodate a larger number of users per channel at a given access delay than can a pure mobile telephone system. Stated alternatively, a user of a mobile telephone system having a certain number of users per channel will experience a relatively longer access delay than the user of a pure dispatch system with the same number of users per channel. If telephone traffic is indiscriminately mixed with dispatch traffic on a trunked radio system, the possibility exists that dispatch system access delay will be degraded to that of the pure mobile telephone system.

SUMMARY OF THE INVENTION

Accordingly, it is an object of the present invention to maintain short access times for dispatch traffic on a trunked radio system which interfaces with telephone interconnect service.

It is yet another object of the present invention to allow as much telephone traffic as possible on a trunked radio system within the constraints of a desired access delay for dispatch call requests.

It is still another object of the present invention to automatically limit the duration of telephone interconnect calls in order to maintain a desired access delay for interconnect call traffic.

It is still another object of the present invention to dynamically adjust channel resources available for telephone interconnect service to maintain a desired average system access delay for dispatch users.

It is yet another object of the present invention to maintain a desired average system dispatch access delay for mobile traffic on a trunked radio system with dispatch priority.

Briefly described, the present invention contemplates a method and means for minimizing dispatch access delay in a trunked radio system. The present invention determines the number of dispatch and interconnect calls active on the system at any instant. The present invention then determines the duration of the dispatch and interconnect calls. If the number of interconnect calls at any instant exceeds a dynamically alterable number, new interconnect calls are queued. Interconnect calls exceeding a predetermined maximum duration are terminated. The predetermined number and predetermined duration allowed for interconnect calls is updated on a periodic basis based on the number and duration of dispatch calls, and the average access delay for dispatch and interconnect calls for the previous period.

DETAILED DESCRIPTION OF THE DRAWINGS

Figure 1:
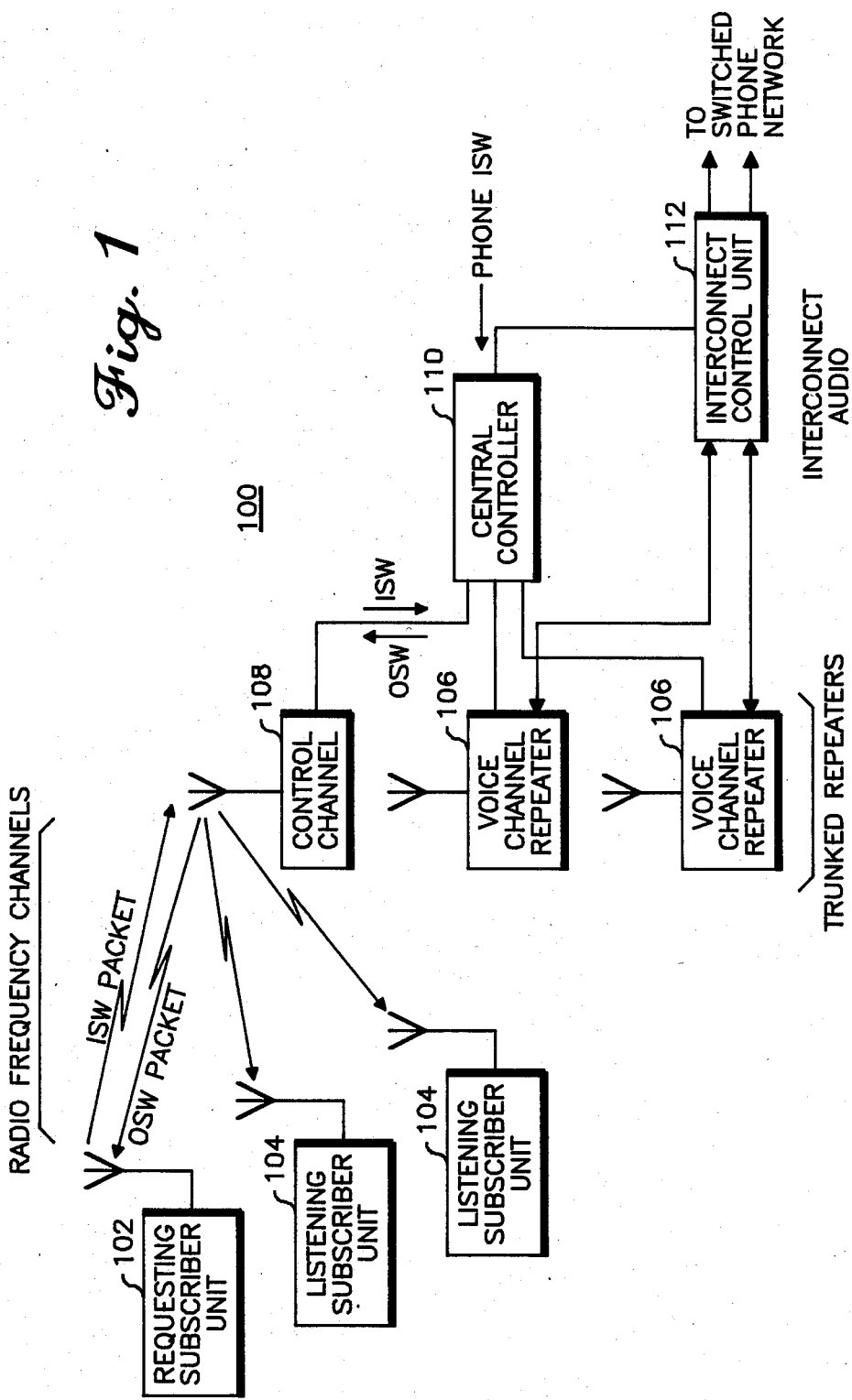
FIG. 1 is a block diagram of a trunked radio system which is interconnected to a conventional duplex telephone system.

FIG. 1 is a block diagram of a trunked radio system which is coupled to a conventional telephone interconnect system. The trunked land mobile radio system 100 consists subscriber units 102, 104, which may be either mobile or portable units, a plurality of trunked repeaters 106, and a trunked central controller 110. The trunked central controller 110 is also coupled to a control channel transceiver 108 which transmits and receives control information on a separate frequency. The trunked central controller 110 and trunked repeaters 106 are also connected to an interconnect control unit which serves to connect the trunked repeaters to the public switched telephone network. The trunked radio system utilizes additional trunked repeaters as dictated by the number of channels operative on the trunked system. In the quiescent state, all subscriber units 104, 106 monitor the outbound frequency of the trunked repeater 108 which is designated as the control channel.

To establish a "dispatch call" between a group of units operating on the trunked system, a subscriber unit 102 sends a data packet called an "Inbound Signalling Word" (ISW). The ISW contains the requesting unit's unique ID code, consisting of a fleet ID, an individual ID, and a "subfleet" code indicating to which group of units it wants to talk. The ISW also contains a unique "call type" code which indicates that a dispatch call is the type of call desired. The request is forwarded to the central controller 110, which decodes the request, and transmits a data packet called an "Outbound Signalling Word" (OSW) to all subscriber units 102, 104 which are monitoring the outbound control channel. The OSW is a channel grant which contains the subfleet code, the requesting unit's ID code, and the voice channel number assigned for the conversation. The OSW causes the requesting unit to move to the voice channel and commence transmitting, and causes all mobiles with matching fleet and subfleet ID's to move to the voice channel as listening units. In this way, a group or "subfleet" call conversation is set up. If all the voice channels are in use, the central controller 110 sends the requesting subscriber unit 102 a "Busy OSW".

In the trunked radio system of the present invention, telephone interconnect calls may be established on the trunked radio system from either a mobile unit or a land based telephone interconnect caller. In the case of calls initiated from mobile units, an ISW request is sent as for dispatch calls described above, except that the "call type code" is that for an interconnect call. The central controller sends an OSW "channel grant" to the requesting mobile 102, causing the mobile to move to the voice channel while at the same time directing the interconnect control unit 112 to establish a connection from the corresponding repeater to the land based telephone line. If the central controller determines that an interconnect call should not be made, the central controller 110 sends the requesting unit 102 an "interconnect busy" OSW.

For calls initiated from the land line, the interconnect control unit 112 generates a request to the central controller 110 for a particular mobile to be assigned to an interconnected voice channel. The request takes the form of an ISW with the identification and call type information as described above. If a channel is available to be assigned to the interconnect call, a "ring OSW" is sent via the outbound control channel to the target mobile 102. If the central controller 110 determines that an interconnect call should not be made at this time, a busy identification is returned to the land line caller.

Figure 2:
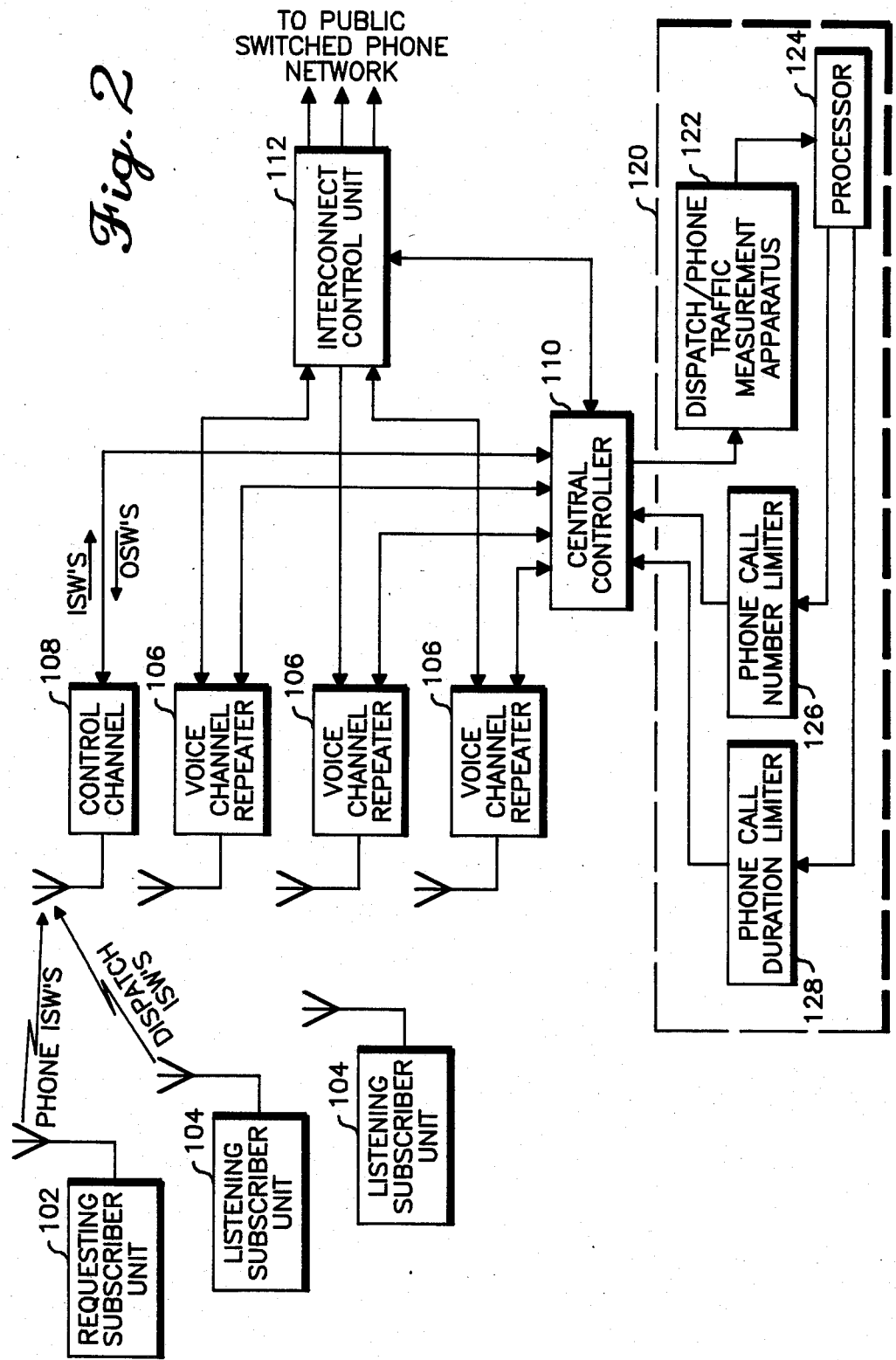
FIG. 2 is a block diagram of a trunked radio system, having telephone interconnect capability, which embodies the features of the present invention.

Referring now to FIG. 2, there is shown a block diagram of a trunked radio system coupled to a telephone interconnect system which embodies the features of the present invention. As mentioned above, if telephone interconnect traffic is allowed unrestricted access to the trunked radio system, the possibility exists that dispatch call access time may be severely degraded, i.e. increased. The present invention protects dispatch traffic from experiencing long access delays due to telephone traffic seizing repeaters for lengthy periods by dynamically limiting the number of simultaneous telephone conversations on the system. The present invention operates with, but is not limited to, the trunked radio system of FIG. 1 with the addition of the telephone interconnect dynamic control unit 120. A mobile radio suitable for use as a subscriber unit 102, 104 in the trunked radio system of FIGS. 1 and 2 is shown and described in detail in Motorola instuction manual 68P81043E50 entitled "Trunked Syntor X Mobile Radio". A repeater suitable for use in the trunking system of FIGS. 1 and 2 is shown and described in Motorola instruction manual 68P81038E85 entitled "Micor Trunked Repeater". The abovementioned manuals are incorporated herein by reference and may be obtained from the Service Publications Department of Motorola, Inc., 1301 East Algonquin Road, Schaumburg, Ill. or from Motorola C & E Parts, 1303 East Algonquin Road, Schaumburg, Ill.

Referring still to FIG. 2, the present invention comprises the trunked radio system of FIG. 1 with the addition of the telephone interconnect dynamic control unit 120. The telephone interconnect dynamic control unit 120 interfaces with the central control unit 110 in several ways. The central control unit provides the telephone interconnect dynamic control unit 120 with data indicating the nature and duration of calls, both dispatch and interconnect, currently on the system. This data is utilized by the dispatch/phone traffic measurement circuit 122 which converts the call data to system usage measurements used by processor 124. Processor 124 examines the output of the dispatch/phone measurement apparatus and generates control signals which control the phone call number limiter 126 and the phone call time limiter 128 in accordance with predetermined system parameters. The phone call number limiter 126 and the phone call length limiter 128 provide outputs, coupled to the central controller, which determine the number and duration of interconnect telephone calls the central controller will allow on the system at any particular time. In the preferred practice of the present invention, the control algorithm for telephone interconnect dynamic control unit 120 is resident in the central control unit 110 and processor 124 is shared commonly between the central control function and the telephone interconnect dynamic control function. The detailed operation of the central control unit 110 and the telephone interconnect dynamic control unit 120 will be discussed in conjunction with FIGS. 7 through 12.

Figure 3A:
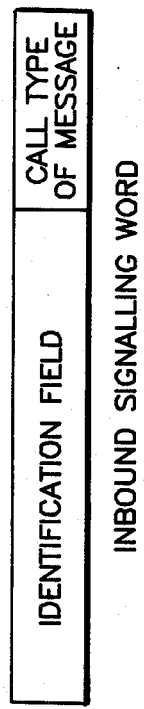
FIGS. 3A and 3B are timing diagrams showing the details of the inbound and outbound signalling words used in accordance with the teachings of the present invention.
Figure 3B:
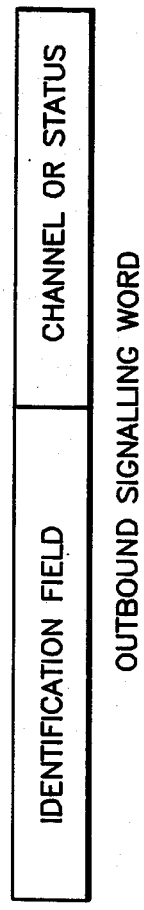

Referring now to FIGS. 3A and 3B, there is shown a timing diagram detailing the configuration of the Inbound and Outbound Signalling Words described in FIG. 1. The Inbound Signalling Word comrises a 21 bit data packet which is sent from a requesting subscriber to the central controller when a channel assignment is required. The first sixteen bits correspond to an identification field, which identifies a particular unit's fleet, subfleet, and individual address assignments. The remaining five bits of the 21 bit packet identify the type of call or message to be communicated on the voice channel.

Referring now to FIG. 3B, the configuration of the Outbound Signalling Word is shown in detail. The Outbound Signalling Word is used to communicate channel assignments from the central control unit to the requesting subscriber units. The Outbound Signalling Word comprises a 27 bit data packet wherein the first sixteen bits are used as a subscriber identification field. The remaining 11 bits communicate channel assignments or status information to the requesting mobile unit.

Figure 4:
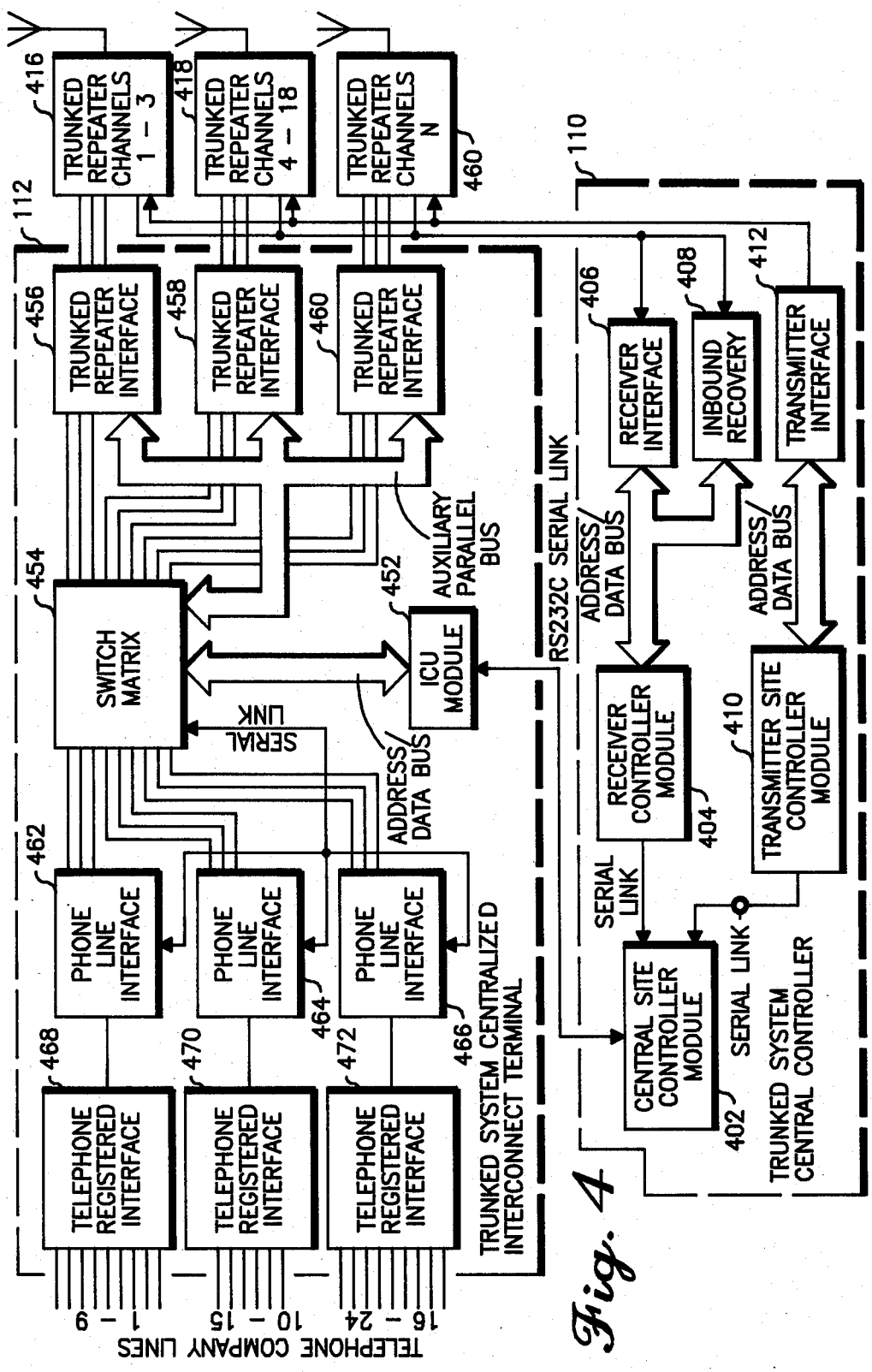
FIG. 4 is a more detailed block diagram of construction of the land based portion of the trunked radio system of FIGS. 1 and 2.

FIG. 4, is a more detailed block diagram of the trunked radio system of FIGS. 1 and 2. The trunked system central controller 110 of FIGS. 1 and 2 consists of a central site controller module 402 which communicates with a receiver site controller module 404, a transmitter site control module 410, and the interconnect control module 452. Communication between these modules is via a conventional RS-232C serial interface. The central site controller 110 receives ISWs which are recovered from the receiver site controller module 404. The receiver site controller 404 is coupled to a plurality of receiver interface boards and an inbound recovery board 408 through an address/data bus which communicates the decoded repeater output from the inbound recovery board 408 or receiver interface board 406 to the receiver site controller module 404.

After the ISW has been received, the central site controller module 402 responds to the requesting unit by generating an OSW containing channel assignment information. The OSW is communicated to the requesting unit via the serial data link coupled between the central site controller 402 and the transmitter site controller module 410. After the transmitter site interface board receives the OSW from the central control module, it is placed on an address/data bus which is shared commonly with a plurality of transmitter interface boards which ultimately control the repeaters 416, 418, 420, etc. In response to an ISW, the central control unit 402 may additionally instruct the interconnect control unit 452 to interconnect a telephone line to a particular repeater. Communication between the central control module and the interconnect control module is via another RS-232C serial interface. The exact circuit configuration and detailed description of the operation of the central control unit 110 is described in conjunction with FIG. 5 and is further described in Motorola instruction manual entitled "Trunked System Central Controller", numbers 68P81047E50 and 68P81066E60, available from the Service publications Department of Motorola, Inc., 1301 E. Algonquin Road, Schaumburg, Ill.

The interconnect control unit 112 of FIGS. 1 and 2 consists of the interconnect control module 452 which controls the operation of the switch matrix boards 454, the interconnect line interface boards 462, 464, 456, and the trunked repeater interface boards 456, 458, and 460. The interconnect control module 452 communicates with the switch matrix 454 via a parallel address/data bus. The interconnect control unit communicates with the interconnect line interface boards through the switch matrix 454 and a serial link which couples the phone line interface boards 462, 464, and 466 with the switch matrix 454. The interconnect control module communicates with the trunked repeater interface boards 456, 458, and 460 via the auxiliary parallel address/data bus coupled between the switch matrix 454 and the trunked repeater interface boards 456, 458, and 460. The phone line interface boards 462, 464, and 466 are additionally coupled to telephone registered interface boards 468, 470, and 472. The telephone line interface boards 462, 464, and 466 are used to generate and decode the various signalling tones which are required to control the operation of the telephone interconnect system. The registered interface boards are used for signal conditioning and level control before the telephone signal is applied to the switch matrix 454. The operation of the interconnect control unit 112 is described further in conjunction with FIG. 6. A detailed circuit diagram and operation of the interconnect control unit 112 is shown and described in Motorola instruction manual 68P81063E20 entitled "Trunked System Central Controller", available from the Service Publications Department of Motorola, Inc., 1301 East Algonquin Road, Schaumburg, Ill. This and the above-mentioned manuals are all incorporated herein by reference.

When a given telephone interconnect is requested from a subscriber unit, control module 402 instructs the interconnect control module 452 to obtain a telephone connection via the phone line interface board and couple the phone line to a specific repeater. The phone line interface board output 462, 464, or 466 and the trunked repeater interface boards 456, 458, or 460 are then coupled via the switch matrix 454. The output of the particular trunked repeater interface board is then coupled to a particular trunked repeater as instructed by the interconnect control unit.

If an interconnect is required from land line to a mobile unit, the telephone interface boards 462, 464, or 466 detect the phone signalling on the land line and then notify the interconnect control unit that a call is waiting on line "N". This message is communicated via a serial link. The interconnect control then requests a repeater channel by placing an ISW on the serial link coupled between the interconnect control unit and the system central controller. The system then asssigns a repeater in accordance with the method of the present invention, and instructs the interconnect control module 452 to couple telco line "N" to a specific repeater via the switch matrix 454 and the trunked repeater interfaces 456, 458, and 460.

Telephone interconnect calls for both dispatch initiated and land line initiated calls are terminated by the central controller 110 according to the same method wherein the central control unit 110 signals the mobile unit and the land line interconnect that the call is about to be terminated by sending commands which instruct the interconnect control unit to terminate the interconnect and instruct the mobile unit to return to monitoring the control channel. The mobile unit may terminate an interconnect call by sending an end of call signal, in the form of an ISW, to the central controller 110. In a similar fashion, if the telephone interconnect caller terminates the call, the interconnect control unit 112 signals the end of the interconnect by sending an end of call ISW to the central control unit 110.

Figure 5:
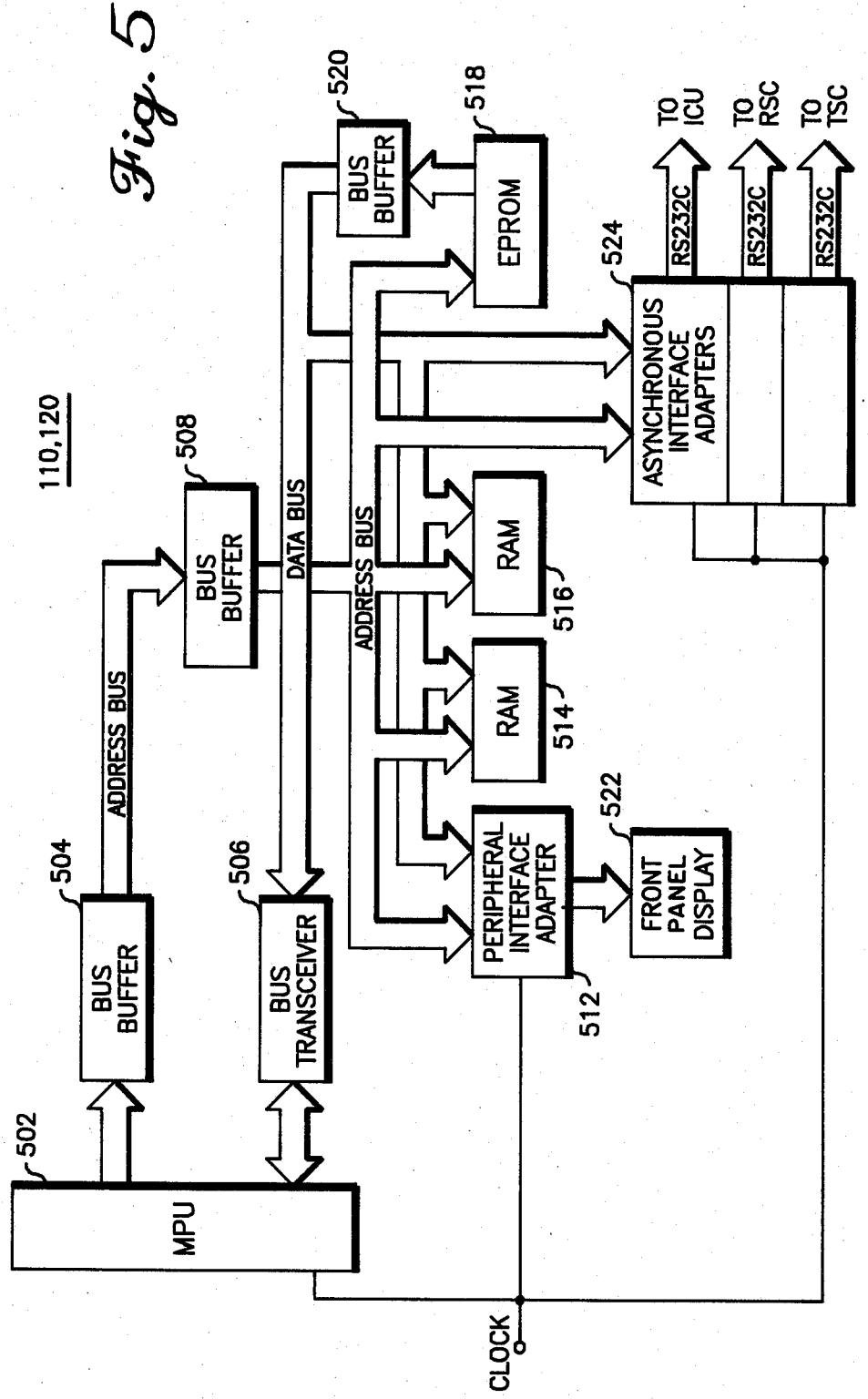
FIG. 5 is a schematic and block diagram of the central control unit of FIG. 5.

Referring now to FIG. 5, there is shown an electrical schematic and block diagram of the central controller 110, and the telephone interconnect dynamic control unit 120 of FIG. 2. As mentioned earlier, the central controller and telephone interconnect dynamic controller are co-resident on the same processing unit. The control unit comprises a general purpose microprocessor 502 which interfaces with a bus buffer 504 and a bus transceiver 506. The microprocessor supports the basic operation of the central control unit as well as the operation of the telephone interconnect dynamic control unit by executing the routines described in the flow diagrams of FIGS. 7 through 12. Microprocessor 502 may be any general purpose microprocessor such as a Motorola MC6809 available from Motorola Semiconductor Inc., 3501 Ed Bluestein Blvd., Austin, Tex. The bus buffer 504 is additionally coupled to bus buffer 508 which provides address information to the peripheral interface adapter (PIA) 512, the random access memories (RAM) 514, and 516, the read-only memory (ROM) 518 and the asynchronous interface adapter (ACIA) 524. Bus transceiver 506 communicates data between the microcomputer 502 and the peripheral interface adapter 512, the RAM memories 514, 516, the ROM 518 and the asynchronous interface adapter 524. The PIA 512 is additionally coupled to a front panel display which serves as a system indicator. The asynchronous interface adapter converts the data present on the data bus to the serial signals communicated between the central control module and the receiver site controller, the transmitter site controller and the interconnect control unit 112 of FIG. 4. The peripheral interface adapter, the RAM memories, the ROM, and the asynchronous interface adapter may be any of several off-the-shelf components which are designed to interface with the microcomputer described above.

Figure 6:
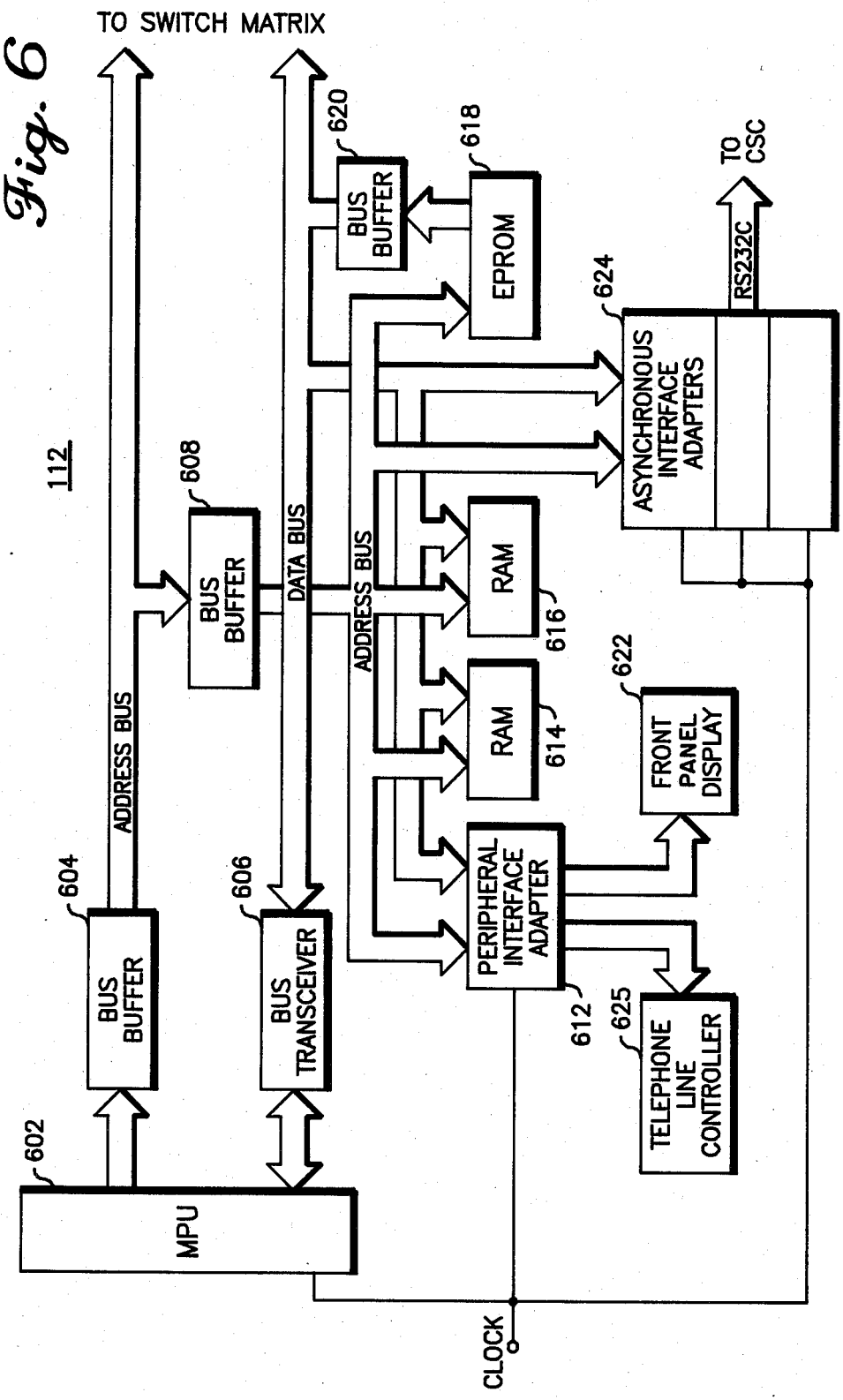
FIG. 6 is a schematic diagram of the interconnect control unit of FIG. 5.

Referring now to FIG. 6, there is shown an electrical schematic and block diagram of the interconnect control unit 112 of FIG. 2. The interconnect control unit comprises a general purpose microprocessor 602 which interfaces with a bus buffer 604 and a bus transceiver 606. Microprocessor 602 may be any general purpose microprocessor such as a Motorola MC6809 available from Motorola Semiconductor Inc., 3501 Ed Bluestein Blvd., Austin, Tex. The bus buffer 604 is additionally coupled to bus buffer 608 which provides address information to the peripheral interface adapter 612, the random access memories 614, and 616, the read-only memory 618 and the asynchronous interface adapter 624. Bus transceiver 606 communicates data between the microcomputer 602 and the peripheral interface adapter 612, the RAM memories 614, 616, the ROM 618 and the asynchronous interface adapter 624. The PIA 612 is additionally coupled to a front panel display which serves as a system indicator, and a parallel data bus which couples the phone line interface circuits 462, 464, and 466 of FIG. 4. The interconnect control module is also coupled to the switch matrix 454 and trunked repeater interface boards 456, 458, and 460 of FIG. 4 via the data and address bus outputs of bus buffer 604 and bus transceiver 606. The asynchronous interface adapter converts the data present on the data bus to the serial signals communicated between the central control module and the interconnect control unit 112 of FIG. 4. The peripheral interface adapter, the RAM memories, the ROM, and the asynchronous interface adapter may be any of several off-the-shelf components which are designed to interface with the microcomputer described above.

The operation of the present invention will be discussed in detail below. Briefly however, the operation of the present invention may be summarized as follows. The present invention operates on a fifteen minute update cycle and is constantly monitoring the amount of dispatch and telephone interconnect airtime being used as well as the access delays being experienced by both types of users. In response to the dispatch airtime used, the present invention reserves a number of repeaters for dispatch use only during the next fifteen minute interval. This action anticipates the effect of interconnect traffic, thus preventing large dispatch delays from occurring. In response to measurements of relatively large access delays for dispatch calls, the present invention curtails the number of simultaneous interconnect calls allowed. This action improves the access delays for dispatch calls after delays have occurred at the possible expense of longer delays for interconnect calls. In response to measurements of large access delays for interconnect calls, the present invention reduces the maximum length of an interconnect call. Imposing a time-out limit on interconnect calls tends to improve the number of interconnect calls that can be serviced per unit time, reducing the interconnect access delay.

The operation of the present invention is best described in two parts. The first portion is described in terms of call-by-call processing and the second portion is described in terms of the periodic update of control parameters. Briefly, for calls initiated from mobile units, an ISW request is sent from the mobile unit to the central controller as in dispatch calls above, except that the "call type" code is that for an interconnect call. The central controller sends an OSW "channel grant" to the requesting mobile, causing the mobile to move to the voice channel, while at the same time directing the interconnect control unit to establish a connection from the corresponding repeater to the land based telephone line.

For calls initiated from the land line, the interconnect control unit generates a request to the central controller for a particular mobile to be assigned to an interconnected voice channel. The request takes the form of an ISW with the identification and call type information as described above. If a channel is available to be assigned to the interconnect call, a "ring OSW" is sent via the outbound control channel to the target mobile.

Figure 7:
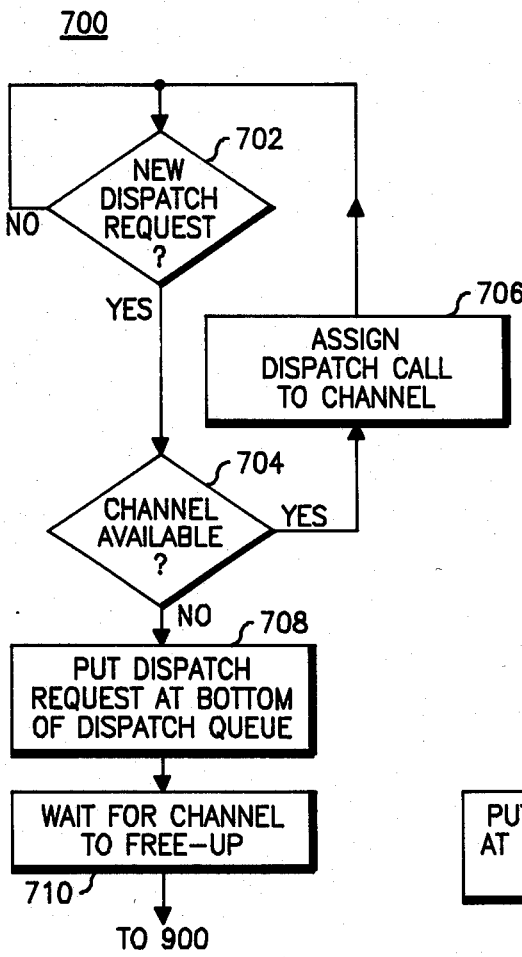
FIGS. 7 through 12 are flow diagrams detailing the operation of the microcomputer of the central control unit of FIG. 5.
Figure 8:
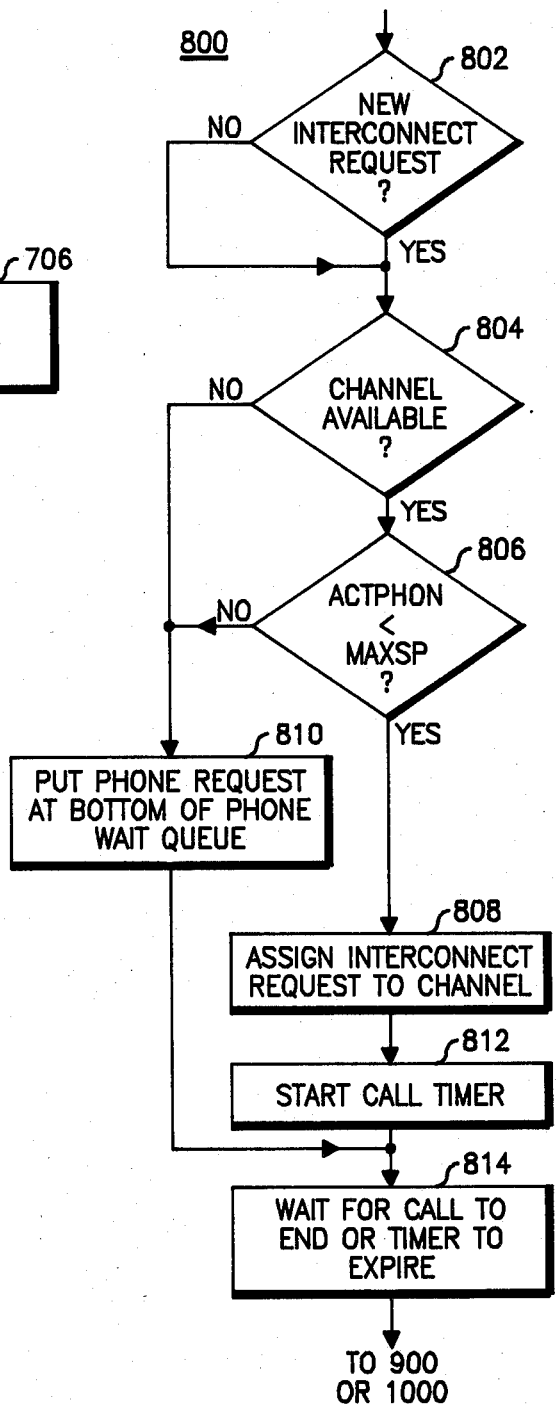

Referring now to FIGS. 7 and 8, there are shown flow diagrams which describe the call-by-call operation of the central control unit and repeaters when service is requested. According to FIG. 7, a dispatch request for service is assigned a repeater immediately if one is available. Routine 700 begins with decision 702 which examines the output of the receiver site control board 404 of FIG. 4, through the RS-232 interface which couples the central site controller 402 of FIG. 4 with the receiver site controller 404. If a new dispatch request has been detected, decision 702 selects decision 704 which examines the system repeaters to determine whether a channel is available. If a channel is available, decision 704 selects item 706 which immediately assigns the dispatch call to a channel. If a channel is not available, decision 704 selects item 708 which puts the dispatch request at the bottom of a dispatch "busy" queue. Item 710 then holds the call in a wait state until a channel is available. When a repeater subsequently becomes available for channel assignment, the request on the top of the dispatch "busy" queue is assigned first. This queuing discipline is referred to as "erlang-C" or "blocked calls queued".

FIG. 8 shows the call-by-call operation for land or mobile initiated telephone interconnect calls. Routine 800 is activated whenever a new interconnect request is initiated. Routine 800 begins with decision 802 which examines the serial data lines to determine whether an ISW has been received. If an ISW is detected, decision 802 selects decision 804 which determines whether a channel is available. If a channel is not available, item 808 is selected, which puts the interconnect request at the bottom of an interconnect "busy" queue. Preferably, the central controller maintains a running count of the total number of repeaters which are assigned telephone interconnect traffic. This variable is designated "ACTPHON" and the method of its derivation will be discussed more fully below. The preferred embodiment also provides that a variable designated "MAXSP" be assigned by the operation of the present invention. MAXSP is a number which indicates the total number of simultaneous interconnect calls which will be permitted of the system at any particular time. The method of deriving MAXSP is discussed more fully below. According to FIG. 8, if a channel is available, decision 806 compares ACTPHON with MAXSP. If ACTPHON is greater than or equal to MAXSP, item 810 is selected and the interconnect request is placed at the bottom of the interconnect busy queue. If ACTPHON is less than MAXSP, item 808 is selected and the interconnect request is assigned a repeater. Item 808 then selects item 812 which starts a call timer which waits for an interconnect call to end or for the timer time to expire before terminating the call. The system then waits for a channel to become available before item 810 selects item 808 for a channel assignment for a call being held in "busy" queue.

Figure 9:
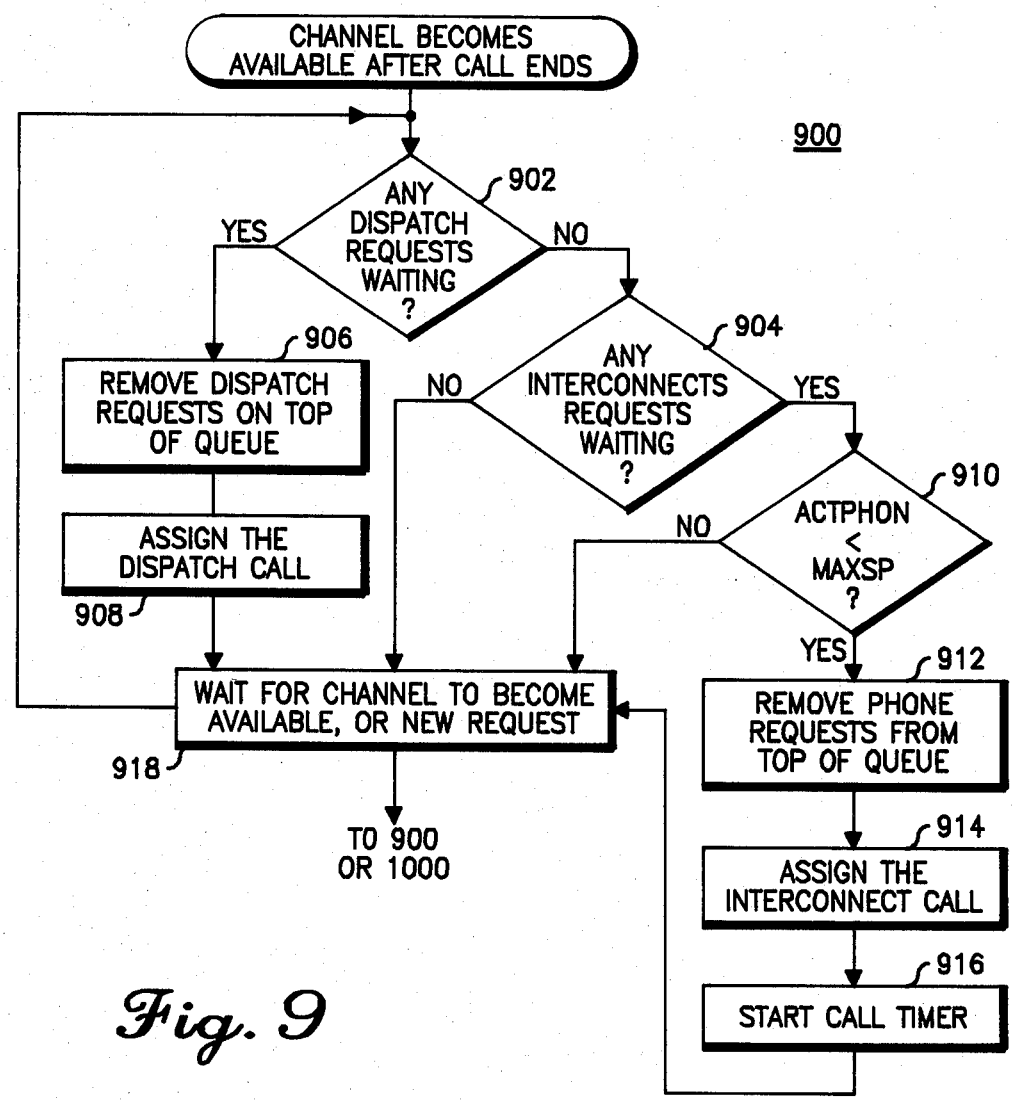

Referring now to FIG. 9, there is shown a flow diagram detailing the call-by-call processing when a channel is released from assignment. According to FIG. 9, decision 902 is selected whenever a repeater is selected for assignment. After a call ends, decision 902 examines the dispatch busy queue first. Dispatch calls are placed on the "busy" queue on a first-in first-out basis. If a dispatch request is waiting, decision 902 selects item 906 which removes the dispatch call on the top of the busy queue and then selects item 908. Item 908 then assigns the dispatch call to a repeater channel and then selects item 918 which enters a wait state until another channel is available. If no dispatch requests are waiting, decision 902 selects decision 904 which examines the interconnect "busy" queue to determine whether there are any interconnect requests waiting. If no interconnect requests are waiting, decision 904 selects item 918 described above. If an interconnect request is waiting, decision 904 selects decision 910 which compares the variables ACTPHON and MAXSP. If ACTPHON exceeds MAXSP, decision 910 selects item 918 described above. If ACTPHON is less than MAXSP, decision 910 selects item 912 which removes the interconnect request at the top of the interconnect "busy" queue and then selects item 914 to assign the interconnect request to a repeater channel. Item 916 is then selected to start the call timer and activate the interconnect call time-out routine of FIG. 10.

Figure 10:
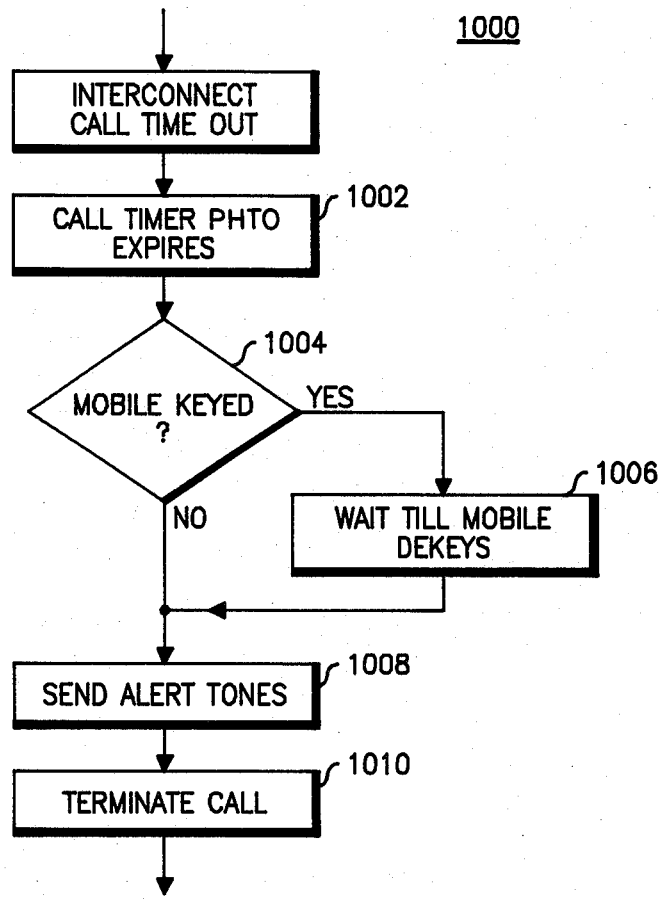

Referring now to FIG. 10, there is shown the interconnect call time-out routine which is selected by item 916 of FIG. 9 or item 814 of FIG. 8. Whenever a interconnect call is assigned, a timer the length of the interconnect call limit (PHTO) is started. The value of PHTO is derived on a periodic basis and will be discussed more fully below. According to FIG. 8, Item 1002 is selected whenever the call timer PHTO expires. When the timer PHTO expires, the call is terminated after warning tones are sounded to the mobile and land line callers. Item 1002 selects decision 1004 which examines the repeater output to determine whether the particular half-duplex mobile radio to currently "keyed" or transmitting. If the mobile is still keyed, decision 1004 selects item 1006 which waits until the mobile "dekeys" and then selects item 1008 which generates and sends alert tones to the mobile and landline caller. Item 1010 is then selected which terminates the call by opening the path between the repeater and the telephone interface boards. Item 1010 then selects item 918 of FIG. 9 to wait until a new channel becomes available.

The second portion of the description of the present invention relates to how the trunked system central controller 110 of FIG. 1 calculates MAXSP and PHTO. In the preferred practice of the present invention, this calculation occurs on a periodic basis. That is, these calculations take place on 15 minute intervals in the trunked system central controller. In addition to MAXSP and PHTO, the trunked system central controller 110 maintains the following measurements of the trunked system traffic to use in the 15 minute control algorithm calculation. The measurement period for the following variables is the previous 15 minute interval. The trunked system central controller 110 of FIGS. 1 and 2 maintains accounting of the cumulative airtime for all dispatch calls, the cumulative "busy" delay time for all dispatch calls (DBUSY), the number of dispatch calls receiving a "busy" delay (NDBUSY), the cumulative "busy" delay time for all interconnect calls (PBUSY), and the number of interconnect calls receiving a "busy" delay (NPBUSY). The variables MAXSP and PHTO from the previous 15 minute time period are also used in the calculation of the current values of MAXSP and PHTO. The calculation of MAXSP and PHTO also utilizes certain values which may be defined by the operator of the trunked radio system, or alternatively may be default values which depend on the configuration of system. The system operator may determine a target dispatch delay value (TDISP), a target interconnect access delay value (TPHON), a minimum value for MAXSP (MINLIM), a minimum value for PHTO (MINLENGTH), and the maximum value for PHTO (MAXLENGTH).

Referring now to FIG. 10, there is shown a flow diagram which describes the control algorithm which calculates MAXSP on a 15 minute periodic basis. Routine 1100 begins with item 1102 which calculates the average repeater utilization for dispatch on the system during the last fifteen minutes by dividing the cumulative dispatch airtime by the total number of seconds of airtime available on each repeater. In other words, dispatch airtime is derived according to the following formula:

$$\text{Average Repeater Utilization} = \frac{\text{cum. Dispatch Airtime (sec)}}{900 \text{ sec.}}$$

The "Average Repeater Utilization" for dispatch is referred to as dispatch "erlangs"

Figure 11:
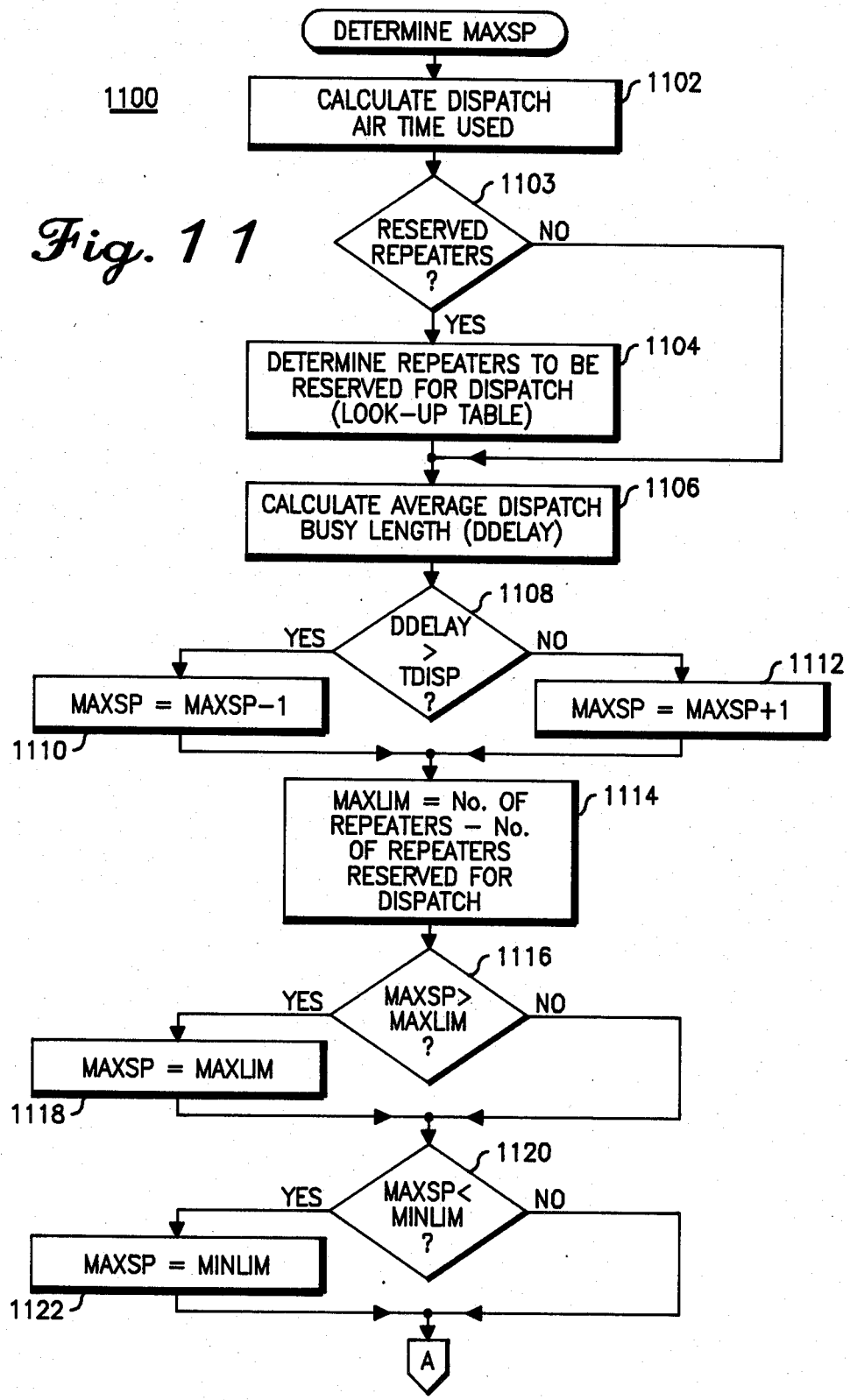

Referring still to FIG. 11, after dispatch airtime is calculated, item 1103 determines whether, according to the trunked radio system operator inputs, repeaters are to be reserved for dispatch use. If repeaters are to be reserved, then item 1104 determines the number of repeaters which should be reserved for dispatch usage during the next fifteen minute interval. Table 1 below shows the number of repeaters to be reserved for dispatch based on the dispatch airtime calculation above.

TABLE 1

| Average Repeater Utilization | Repeaters Reserved for Dispatch | Average Repeater Utilization | Repeaters Reserved for Dispatch |
|---|---|---|---|
| 0.0–.42 | 1 | .42–.83 | 1 |
| 0.84–1.27 | 2 | 1.27–1.17 | 2 |
| 1.7–2.1 | 3 | 2.1–2.5 | 3 |
| 2.5–2.9 | 4 | 2.9–3.4 | 4 |

TABLE 1-continued

| Average Repeater Utilization | Repeaters Reserved for Dispatch | Average Repeater Utilization | Repeaters Reserved for Dispatch |
|---|---|---|---|
| 3.4–3.8 | 5 | 3.8–4.2 | 5 |
| 4.2–4.7 | 6 | 4.7–5.1 | 6 |
| 5.1–5.5 | 7 | 5.5–5.9 | 7 |
| 5.9–6.4 | 7 | 6.4–6.8 | 8 |
| 6.8–7.2 | 8 | 7.2–7.6 | 8 |
| 7.6–8.1 | 9 | 8.1–8.5 | 9 |
| 8.5–8.9 | 10 | 8.9–9.3 | 10 |
| 9.3–9.7 | 11 | 9.7–10.1 | 11 |
| 10.1–10.6 | 12 | 10.6–11.0 | 12 |
| 11.0–11.5 | 13 | 11.5–11.9 | 13 |
| 11.9–12.3 | 14 | 12.3–12.7 | 14 |
| 12.7–13.1 | 14 | 13.1–13.5 | 15 |
| 13.5–14.0 | 15 | 14.0–14.4 | 16 |
| 14.4–14.9 | 16 | 14.9–15.3 | 17 |
| 15.3–15.7 | 17 | 15.7–16.1 | 18 |
| 16.1–16.6 | 18 | 16.6–17.0 | 18 |
| 17.0–17.4 | 19 | 17.4–17.8 | 19 |
| 17.8–18.2 | 19 | 18.2–18.7 | 19 |

After item 1104 determines the number of repeaters to be reserved for dispatch, or if item 1103 determines that no repeaters are to be reserved for dispatch use, then item 1106 calculates the average length of a busy delay for dispatch calls according to the following relationship:

$$DDELAY = \frac{\text{Cumulative busy delay for dispatch calls}}{\text{Number of dispatch busies in 15 minutes}}$$

As mentioned above, the operator of the trunked mobile radio system may establish a target dispatch delay (TDISP), a target interconnect delay (TPHON), and a minimum value of MAXSP (MINLIM). After item 1106 calculates DDELAY, decision 1108 compares the current value of DDELAY with the target dispatch delay (TDISP). If the average dispatch delay DDELAY is greater than the target dispatch delay value TDISP, then item 1110 decreases MAXSP by 1. If the average dispatch delay is less than the target value TDISP, then item 1112 increases the value of MAXSP by 1. The effect of the above adjustment is that in response to measurements of large access delays for dispatch calls, the invention reduces the number of simultaneous interconnect calls allowed. This action improves the access delay for dispatch calls, after delays have occurred, at the possible expense of longer delays for interconnect calls. MAXSP is automatically adjusted to be as large as possible, consistent with the desired target dispatch delay value. Routine 1100 then proceeds to verify that MAXSP is within desired limits. Item 1114 calculates a new value MAXLIM which represents the maximum value that MAXSP can attain. According to the principles of the present invention, MAXLIM is preferably derived according to the following formula:

MAXLIM = # of active repeaters − # of repeaters reserved for dispatch

According to item 1116 and 1118, if MAXSP is greater than MAXLIM, then MAXSP is set to MAXLIM. The effect of this action is that in response to measurements of dispatch repeaters utilized, the present invention reserves repeaters for dispatch only operation during the next 15 minute interval. This action anticipates the effect of interconnect traffic, thus preventing large dispatch delays from occurring. As mentioned above, the value MINLIM is the minimum value desired for MAXSP which may be set by the system operator. If MAXSP is less than MINLIM, then decision 1120 and item 1122 sets MAXSP equal to MINLIM. This action insures that the maximum number of simultaneous interconnect calls allowed (MAXSP) never goes below a prescribed value. This value may even be set to zero if desired. Decision 1120 or item 1122 then selects item 1202 of FIG. 12 for the calculation of a new value of PHTO.

Figure 12:
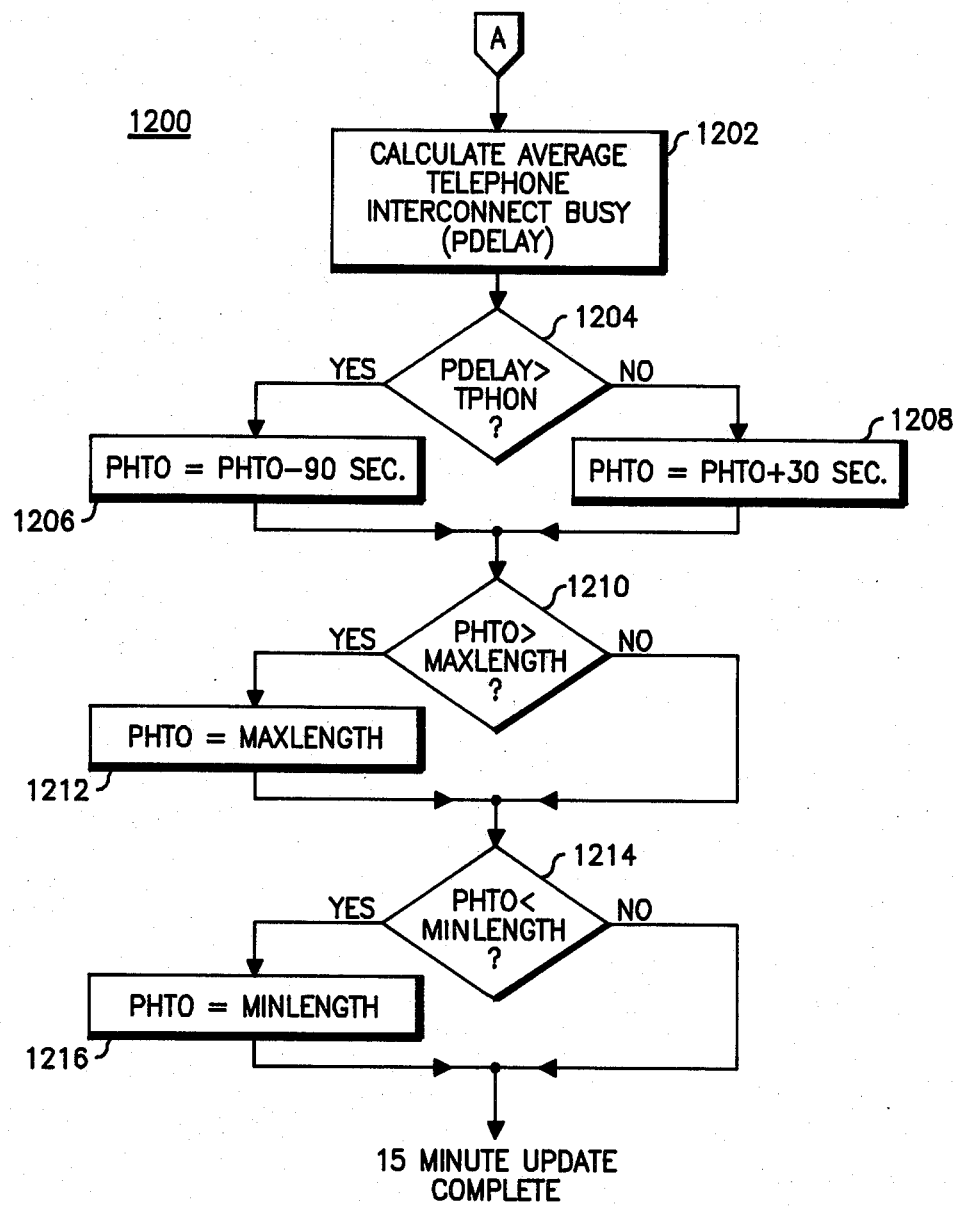

Referring now to FIG. 12, there is a flow diagram detailing the derivation of the value for the maximum length of interconnect call (PHTO) to be allowed on the system during the next fifteen minute interval. Routine 1200 begins with item 102 which calculates the average telephone interconnect busy delay (PDELAY) according to the following formula:

$$PDELAY = \frac{\text{Cumulative Interconnect Busy Delay}}{\text{Number of Interconnect Busies in 15 min.}}$$

Decision 1204 and items 1206 and 1208 then adjust PHTO upward or downward depending on whether the target interconnect delay (TPHON) was satisfied or exceeded. According to item 1206, if PDELAY was greater than or equal to the target TPHON, then the interconnect call time limit is decreased by 90 seconds. The effect of this adjustment is that by imposing a shorter time limit on interconnect calls than can be serviced per unit time, thus reducing the interconnect call busy delay. Otherwise, the actual interconnect busy delay PDELAY is less than the target, and item 1208 increases the interconnect call time limit by 30 seconds. Thus, during periods of light interconnect load, longer interconnect conversations are automatically allowed.

Finally, PHTO is checked to make sure that it is within the specified limits. According to decision 1210 and item 1212, if PHTO is larger than MAXLENGTH, then PHTO is set to the same value as MAXLENGTH. If PHTO is less than MINLENGTH, then decision 1214 and item 1216 sets PHTO to the same value as MINLENGTH.

In summary, a method for dynamically controlling telephone interconnect traffic on a trunked radio system is described. The present invention continuously monitors traffic on the system and in response reserves repeaters for dispatch use only during a predetermined period. The present invention also dynamically alters the number of simultaneous interconnect calls on the system and additionally establishes a variable maximum call length based on system loading. Accordingly, other uses and modifications will be apparent to one skilled in the art without departing from the spirit and scope of the present invention.

We claim:

1. A method for optimizing dispatch access delay in a trunked radio system which is coupled to a conventional telephone interconnect system, said method comprising the steps of:
   (a) measuring average system dispatch access delay;
   (b) measuring the current number of simultaneous interconnect calls;
   (c) measuring the duration of each of said interconnect calls;
   (d) queuing subsequent interconnect call requests if the measured number of simultaneous interconnect calls is greater than or equal to a set predetermined value; and (e) terminating any particular measured interconnect call if the duration of said call exceeds a set predetermined maximum period.

2. The method of claim 1 wherein said predetermined maximum period is periodically updated and reduced in response to an increasing interconnect access delay.

3. The method of claim 1 wherein said set predetermined value is dynamically reduced in response to an increasing dispatch access delay.

4. The method of claim 1 wherein an end of call signal is generated before a call is terminated.

5. The method of claim 1 wherein average dispatch access delay is calculated according to the following formula:

$$\text{Ave. Delay} = \frac{\text{Total Accumulated Message Delay}}{\text{Number of Calls Delayed}}$$

6. The method of claim 1 wherein calls are queued according to erlang-C discipline.

7. A circuit for maintaining dispatch access delay in a trunked radio system which is coupled to a conventional telephone interconnect system, wherein interconnect type calls are permitted access to said trunked radio system based on periodically updated system operating parameters, said circuit comprising:

(a) means for measuring the relative system loading for both dispatch and interconnect type calls to determine avarage dispatch access delay, the average interconnect access delay, the number of simultaneous interconnect calls at any particular instant, and the duration of each of said interconnect calls;

(b) means for setting and retaining critical system parameters, said parameters including the absolute maximum and minimum number of simultaneous interconnect calls to be permitted on the system, an absolute maximum and minimum duration for said interconnect calls, and a target value for dispatch and interconnect access delay;

(c) means for temporarily setting and retaining variable system parameters, said variable system parameters including the current value for dispatch access delay, the current value for the maximum duration of interconnect calls, and the current value for the number of permissible simultaneous interconnect calls, wherein said variable system parameters are periodically updated;

(d) means for limiting the maximum number of simultaneous interconnect calls, within said absolute maximum and minimum number of simultaneous interconnect calls to be permitted on the system during a particular operating period, in response to a first control signal;

(e) means for limiting the duration of interconnect calls, within said absolute maximum and minimum duration for said interconnect calls, in response to a second control signal; and (f) processing means coupled to both of said retaining means, said interconnect call number limiter means, and said interconnect call duration limiter means, said processing means comparing the target, absolute and temporarily retained values and periodically adjusting said temporarily retained values if the average dispatch access delay during any particular period exceeds the target dispatch access delay value, or if the interconnect access delay exceeds said target interconnect access delay, and generating said second control signal for terminating calls which exceed said maximum duration for said interconnect calls, and said first control signal for limiting the number of simultaneous calls permitted on the system during a particular operating period.

8. The apparatus of claim 7 wherein said means for limiting the duration of a telephone call includes means for signalling users of the system that a call is about to be terminated.

9. The apparatus of claim 7 wherein said means for limiting the maximum number of simultaneous interconnect calls includes means for queuing additional interconnect call requests according to erlang-C discipline.

10. The apparatus of claim 7 wherein said processing means is a microcomputer.

11. The apparatus of claim 7 wherein said means for temporarily setting and retaining variable system parameters is a random access memory which is coupled to said processing means.

12. A method for optimizing dispatch access delay on a trunked radio communications system having a plurality of assignable repeaters, said method comprising the steps of:

(a) measuring the system average repeater utilization for dispatch calls during a predetermined periods, including the currrent period;

(b) setting and retaining values representing maximum and minimum limits for the number of simultaneous interconnect calls permitted during any particular predetermined period;

(c) initializing and retaining a first value, within said maximum and minimum limits, said first value representing the maximum number permitted for simultaneous telephone interconnect calls for the current predefined period based on said system repeater utilization;

(d) setting and retaining a second value representing a target dispatch access delay for dispatch call requests;

(e) accumulating dispatch access delays on a continuous basis, and calculating the average of said dispatch access delays on a periodic basis;

(f) comparing the current average dispatch access delay with the second value on a periodic basis; and (g) reducing said first value, within predefined limits, if the current average dispatch access delay value is greater than or equal to said target value;

(h) increasing said first value, within predefined limits, if the currrent average dispatch access delay is less than said target value.

13. A method of dynamically controlling telephone interconnect traffic on a trunked radio system, wherein critical system operating parameters are updated on a periodic basis, said method comprising the steps of:

(a) setting and retaining a value representing a target interconnect access delay;

(b) setting and retaining values representing a maximum and minimum duration limits for interconnect calls during a predetermined period;

(c) initializing and retaining a value representing the maximum duration permitted for an interconnect call for the current predetermined period;

(d) periodically calculating the average interconnect access delay for the previous predetermined period;

(e) periodically comparing said calculated average interconnect access delay with said target interconnect access delay;

(f) reducing said maximum duration for interconnect calls permitted during the current predetermined period, within said duration limits, if said interconnect access delay is greater than or equal to said target interconnect access delay value and said current maximum duration exceeds said set minimum duration limit; and (g) increasing said maximum duration for interconnect calls permitted during the current predetermined period, within said duration limits, if said interconnect access delay is less than said target interconnect access delay value and said current maximum duration is less than said set maximum duration limit; and (h) terminating a particular interconnect call if its duration exceeds said maximum duration for interconnect calls permitted for that particular operating period.

14. The method of claim 6 which further includes the steps of periodically reserving certain repeaters for dispatch use only in response to an increasing average dispatch access delay.

15. The method of claim 14 further including the step of manually overriding said repeater reserving step based on an operator input.

16. A method for optimizing traffic on a communications system supporting a variety of diverse types of traffic wherein at least one type of traffic is assigned a relatively higher priority and wherein system operating parameters are updated periodically based on predetermined periods, said method comprising the steps of:

(a) setting and retaining a value representing a target access delay for the highest priority type of traffic;

(b) initializing and retaining values representing the duration and number of simultaneous lower priority calls permissible for relatively lower priority traffic during the current predetermined period, wherein said system loading is affected by number of simultaneous calls and call duration;

(c) accumulating and averaging the actual access delay for said higher priority traffic over the previous predetermined period;

(d) comparing said accumulated and averaged access delay for said higher priority traffic with said retained target access delay value; and (e) reducing said initialized and retained value representing the number of simultaneous lower priority calls permissible during the current predetermined period if the high priority access delay is greater than or equal to said target access delay.

17. The method of claim 16 further including the steps of:

(f) initializing and retaining a value representing a target access delay for relatively lower priority traffic;

(g) accumulating and averaging the actual access delay for said lower priority traffic over a predetermined period;

(h) comparing said averaged access delay for relatively lower priority traffic with said target access delay;

(i) reducing said value representing the duration of said lower priority calls if said averaged access delay exceeds said target access delay; and (j) terminating calls whose length exceeds said value representing the duration of said lower priority calls.

18. The method of claim 16 wherein lower priority calls are queued if the number of said simultaneous lower priority calls is greater than or equal to the value representing the number of simultaneous lower priority calls permissible.

19. The method of claim 16 wherein said initialized and retained value representing the system loading permissible for relatively lower priority calls during said predefined period is increased if the high priority access delay is less than said target access delay.

20. The method of claim 16 further including the step of reserving channel resources for said high priority type of traffic in response to an increasing access delay for said high priority traffic.

21. The method of claim 17 wherein said high priority traffic is characterized by a relatively short message length with respect to said lower priority traffic.

* * * * *